(12) United States Patent
Amos et al.

(10) Patent No.: US 8,437,457 B1
(45) Date of Patent: May 7, 2013

(54) SYSTEM AND METHOD FOR CALL ROUTING BASED ON SOURCE OF CALL

(75) Inventors: Jason Amos, Albertville, AL (US); Jones E. Allison, III, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 454 days.

(21) Appl. No.: 12/710,440

(22) Filed: Feb. 23, 2010

(51) Int. Cl.
*H04M 15/00* (2006.01)

(52) U.S. Cl.
USPC ............... 379/127.01; 379/210.02; 379/137

(58) Field of Classification Search ........... 379/93.02, 379/127.01, 137, 210.02
See application file for complete search history.

(56) References Cited

U.S. PATENT DOCUMENTS

| | | | |
|---|---|---|---|
| 5,027,384 A | 6/1991 | Morganstein | 379/67 |
| 5,402,478 A | 3/1995 | Hluchyj et al. | 379/221 |
| 5,768,360 A | 6/1998 | Reynolds et al. | 379/220 |
| 5,878,126 A | 3/1999 | Velamuri et al. | 379/219 |
| 6,167,042 A * | 12/2000 | Garland et al. | 370/354 |
| 6,205,214 B1 | 3/2001 | Culli et al. | 379/220 |
| 6,330,311 B1 | 12/2001 | Mijares, Jr. et al. | 379/112.01 |
| 6,426,955 B1 | 7/2002 | Gossett Dalton, Jr. et al. | 370/401 |
| 6,487,196 B1 * | 11/2002 | Verthein et al. | 370/352 |
| 2003/0224764 A1 * | 12/2003 | Baker | 455/414.1 |
| 2005/0180393 A1 * | 8/2005 | Skubisz | 370/352 |
| 2009/0046841 A1 * | 2/2009 | Hodge | 379/189 |

\* cited by examiner

*Primary Examiner* — Creighton Smith
(74) *Attorney, Agent, or Firm* — Fish & Richardson P.C.

(57) ABSTRACT

A system and method routes a call within a communications network. A call routing device is interconnected to a plurality of trunks forming trunk groups and receives a call. A database stores a dialing plan having data related to restrictions as to which outbound trunk from the call routing device can be used based on an originating account as either a station or trunk of a caller or the number of a caller. A call router processor determines an outbound trunk from the call routing device to which a call from a caller is routed at the call routing device if the configured dial plan permits the originating account or number of the caller to access the selected outbound trunk. A call router routes the call from the caller onto the selected outbound trunk.

28 Claims, 13 Drawing Sheets

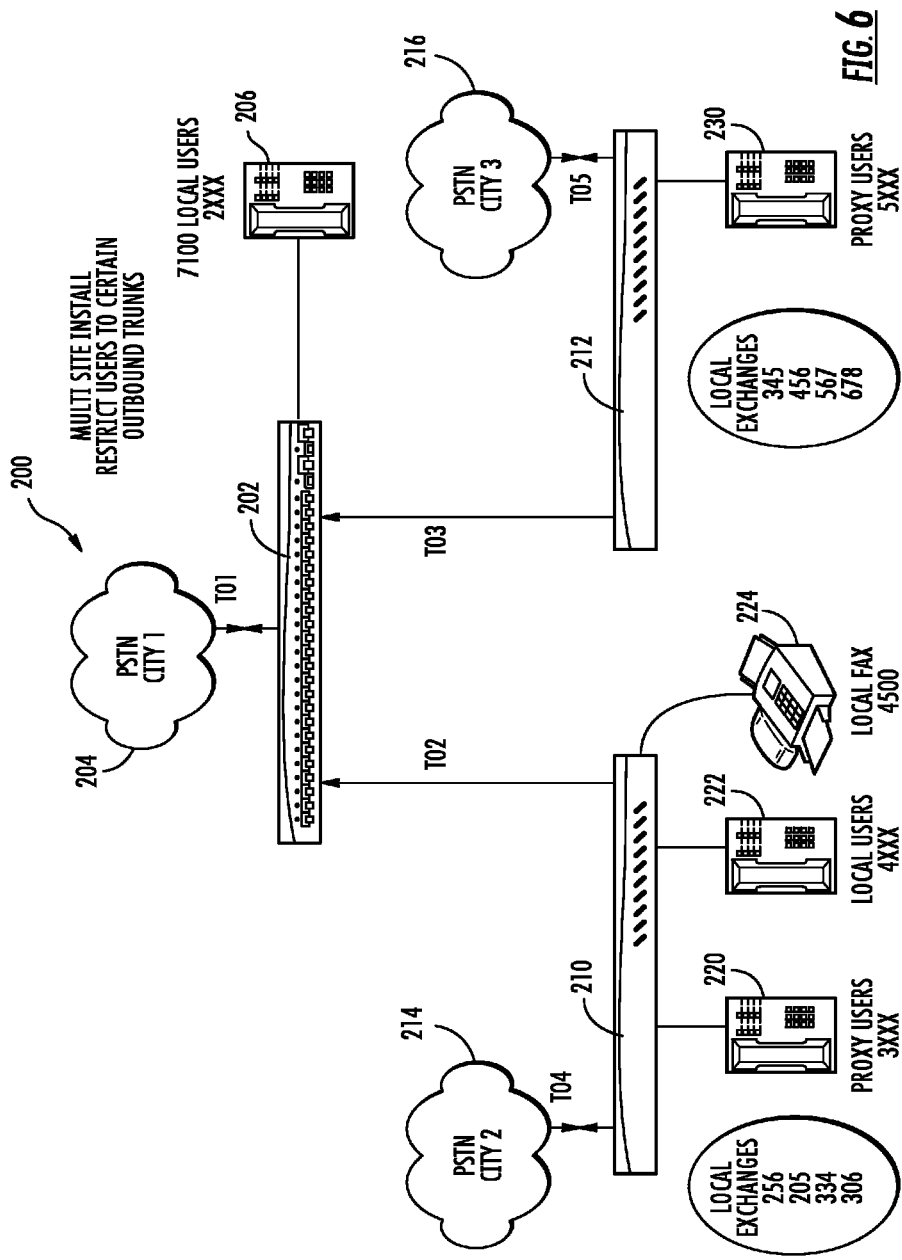

SYSTEM AND METHOD FOR CALL ROUTING BASED ON SOURCE OF CALL

FIELD OF THE INVENTION

This invention relates to communications systems, and more particularly, this invention relates to call routing in a communications system.

BACKGROUND OF THE INVENTION

The call routing functionality in some operating systems, such as some ADTRAN VoiceCore™ applications as a non-limiting example, only considers the dialed number when making a call routing decision. In one example, a "switchboard" operates as a software component in a server or integrated communications platform and routes the call. This switchboard does not consider the source of the call when using its logic to route the call to a trunk. Internal and external calls can be made and survivability is a factor to connect some calls even though in one example the primary Voice over Internet Protocol (VoIP) service is reduced. Survivability is possible for some internal calls that are connected from one phone on the device as an integrated communications platform to another phone on the device without involving an external call-routing service. Survivability is possible for external calls if a secondary service is provided, e.g., when VoIP is the primary service and the secondary service is a PSTN connection. An emergency call takes priority over other calls, e.g., dialing 911. It is desirable to have more efficient routing based on the source of the call.

SUMMARY OF THE INVENTION

A system and method routes a call within a communications network. A plurality of network elements can be formed from communications devices, servers and other devices and form a communications network, which has a plurality of trunks forming trunk groups for communication. A call routing device within the communications network is interconnected to the plurality of trunks forming the trunk groups and receives a call from a caller. The call routing device includes a database that stores a dialing plan having data related to restrictions as to which outbound trunk from the call routing device can be used based on an originating account as either a station or trunk of a caller or the number of a caller. A call router processor is operative with the database and configured to determine an outbound trunk from the call routing device to which a call from a caller is routed at the call routing device if the configured dial plan permits the originating account or number of the caller to access the selected outbound trunk. A call router is configured to route the call from the caller onto the selected outbound trunk.

In one example, the call router processor is configured to determine that certain callers are specifically allowed to call a given trunk while all other callers are denied access based on the stored dialing plan. The call router processor is also configured to determine that certain callers are specifically blocked from using a trunk while other callers are permitted to access based on the stored dialing plan. The call router processor, in another example, is configured to restrict calls to a trunk based on both the dialed number and identity of the caller. The database includes data relating to a list of Automatic Number Identification (ANI) templates. The call router processor is configured to apply the list as permit or deny access categories on selected trunk groups.

In another example, the database includes data relating to station and trunk configurations. The database includes data relating to trunk groups that accept a Dialed Number Identification Service (DNIS). The call router processor is configured to determine a trunk group to which the call is routed based on the DNIS in an example.

In another example, the communications network comprises a Public Switch Telephone Network (PSTN). In another example, the communications network operates in accordance with Session Initiation Protocol (SIP).

A method aspect is also set forth.

BRIEF DESCRIPTION OF THE DRAWINGS

Other objects, features and advantages of the present invention will become apparent from the detailed description of the invention which follows, when considered in light of the accompanying drawings in which:

FIG. 6 is a drawing view showing a multi-site installation configuration that restricts users to certain outbound trunks in accordance with a non-limiting example.

DETAILED DESCRIPTION OF THE PREFERRED EMBODIMENTS

Figure 1A:
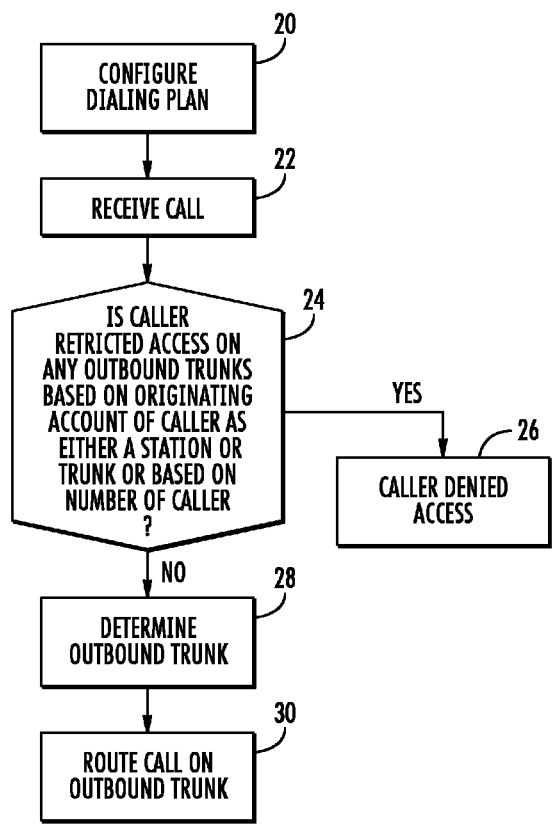
FIG. 1A is an example embodiment of a high-level flowchart showing an example method in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In one current call routing scheme, the call routing can be set to either a local or network mode. In a local mode, the switchboard tries stations as the destination of the call before considering trunk groups. In a network mode, the switchboard varies its call routing based on whether the call is internal or external. If the call is internal, it will first try trunk groups as the destination of the call before considering stations. If a call is external, the switchboard attempts stations first before considering trunks. This logic routes calls to stations and ring groups when the Dialed Number Identification Service (DNIS) matches the account number, e.g., an alias to the account, or a Session Initiation Protocol (SIP) identity of the account. Alias translation occurs after the first routing attempt has been made and no destination has been found. It can reject pre-translated numbers from a trunk group when it is not desirable to deliver that DNIS to the given trunk. Trunks can be in-bound or in-bound/out-bound. If the trunk is a member of the trunk group, it can accept both out-bound and in-bound calls. If the trunk is not a member of a trunk group, it can receive in-bound calls.

These technical issues are apparent in different scenarios as addressed in detail below. For example, a large national carrier may desire to install an Integrated Access Device (IAD) as a call routing device in hotels, for example, as Total Access series devices such as a TA900 as manufactured by ADTRAN, INC. of Huntsville, Ala. This example involves SIP trunking to a soft switch for external call routing. Each hotel may have one or more PSTN lines connected to the IAD for use during survivability. The customer may desire to impose restrictions on external calls placed from the phones in the hotel lines to avoid congesting the Public Switched Telephone Network (PSTN) lines with non-essential calls during survivability. Internal room-to-room calls would be allowed during survivability. The customer may want to limit the rooms to only dialing 911 during survivability. Other external calls placed from the room phones may fail until any primary VoIP service is restored. In this example, the front desk and other business phones should be able to place any business-related external calls out the PSTN lines during survivability. In this example, the originating phone is therefore a differentiator between which calls should be allowed out the PSTN line and which calls should be blocked from the PSTN lines.

In another example, an integrated communications server/platform is a central call-routing device for multi-site installation with an integrated communications platform installed at each remote site, which sends its calls to the communications server/platform to be routed. Each remote site has PSTN conductivity for local calls, emergency calls and survivability. In this scenario, the communications server cannot be configured to route an emergency call from a remote site back to the site's PSTN connection because the communications server cannot currently consider the source of the call.

In accordance with a non-limiting example, a call is potentially routed to multiple destinations and, in one example, a customer/service provider uses the source of the call as one (or the only) criterion when selecting a destination. The call routing is accomplished in a single device as a call routing device as opposed to an entire Public Switched Telephone Network (PSTN) or other network and can consider both the caller ID of the calling party and the originating trunk of the call. In one non-limiting example, Voice over IP (VoIP) and/or PSTN calls are routed in a communications network. In another non-limiting example, the system creates within an IP network switchboard module that could be part of the call routing device at least one list of Automatic Number Identification (ANI) templates and at least one list of trunks and trunk groups connected to a call routing device. The system adds station and trunk configuration pages to a list. The lists are applied as permit or deny access categories on selected trunk groups in order to be listed. Trunks are established that accept a Dialed Number Identification Service (DNIS).

In accordance with a non-limiting example, consideration of the source is added into the call routing decision. The switchboard as part of a call routing device and its mechanism considers either the originating account (a station or a trunk) or the calling party number (for trunk-to-trunk calls) when choosing an outbound trunk. In one non-limiting example, an administrator configures the dial plan so that certain callers are specifically allowed to call out a given trunk while all other users are denied. The administrator configures the dial plan so that certain callers are specifically blocked from using a trunk, while all other users are permitted. In combination with the existing trunk group configuration, this allows the administrator the flexibility of restricting calls to a trunk based on both a dialed number and the identity of the caller.

FIG. 1A is an example high-level flowchart showing a basic sequence of operations in accordance with a non-limiting example. The dialing plan is configured (block 20) and a call received (block 22). A determination is made if the caller is restricted access on any outbound trunks based on originating account of a caller as either a station or trunk or based on the number of the caller (block 24). If yes, access is denied (block 26). If not, a determination is made for the outbound trunk (block 28) and the call routed on the outbound trunk (block 30).

The system permits or denies a call to be routed to a specific outbound trunk based on the originating user or trunk and permits or denies a call from an inbound trunk to be routed to an outbound trunk based on the calling party. The system allows configuration of site-specific routing on the central unit of a multi-unit cluster and configures trunks to prefer routes to trunks even when in network role and of external type.

The system and method, in accordance with a non-limiting example, allow or reject a call from a specific user and permits the call to be routed to a specific outbound trunk, based on the originating user. This allows, for example, a fax or modem to use specific trunks only. The system and method restrict certain users (e.g., hotel guests) to only being able to dial certain numbers out trunks (like 911), while allowing other users (e.g., administrators and front desk personnel in hotels) full access. In another example, a CEO can be given a private line, which is also done with a shared line appearance in an example. Multiple tenant cases are also provided.

The system and method also allow or reject a call from an inbound trunk to be routed to an outbound trunk based on the originating trunk. This can reduce proxy phones from going out back-to-back user agent SIP trunks. The system in one example allows or rejects a call from an inbound trunk to be routed to an outbound trunk based on the calling party. It allows site specific routing on the central unit of a multi-unit cluster and allows trunks to prefer routes to trunks even when in network role and of external type.

In this description, "stations" can refer to any non-trunk account (such as a non-trunk VoiceCore™ account from ADTRAN, INC.), including users, VM, AA, loop back, ring groups, proxy dial, and prompt studio.

As noted before, in one system, the current call routing scheme is based primarily on. NNIS. The call routing mode can be set to either local or network. In local mode, the Switchboard first tries stations as the destination of the call, before considering trunk groups. In network mode, the switchboard varies its call routing based on if the call is internal or external. If the call is internal, it will first try trunk groups as the destination of the call before considering stations. Proxy users are considered trunk users in survivability or failover mode, but are always routed to last. If the call is external based, the switchboard will attempt stations first before considering trunks.

Routing calls to stations, ring groups, and similar elements is straightforward. If the DNIS matches the account number, an alias to the account, or a SIP Identity of the account, then the call is routed to that account. Alias translation occurs after the first routing attempt has been made and no destination has been found. Therefore, it is desirable to reject pre-translated numbers from a trunk group when it is not desirable to deliver that DNIS to the given trunk.

Trunks are inbound or inbound/outbound. If the trunk is a member of a trunk group, then it is capable of accepting outbound calls. If a trunk is not a member of a trunk group, then it is used for receiving inbound calls unless used in a shared line appearance (SLA). The current call-routing paradigm allows for weighted DNIS matches on trunks where the most exact match and lowest weight (or cost) wins. The exact match criteria take precedence over the cost.

Additionally, SLA can be configured to restrict stations to dial out certain trunks, bypassing the actual routing from the switchboard. This emulates a key system and since trunks can be both a "line" and in a trunk group, SLA does not cover all the cases listed above and is only in effect for user-to-trunk routing.

The Source and ANI-Based Routing (SABR) system, as described in one non-limiting example, is based on restricting which trunks (source) or users (ANI) have access to a configured trunk group as best shown and described relative to FIGS. 1-8. In one example, an administrator creates one or more lists of ANI templates and/or one or more lists of trunks and applies those lists as permit or deny on selected trunks groups. In a GUI, the stations and trunk configuration pages contain a method for adding the stations or trunks to an existing list. The switchboard as part of a call routing device uses this configuration to narrow down the possible trunks that can accept the DNIS. This configuration has no affect on the actual best match or cost based routing already in place. These permit/deny lists are typically the first (or highest) match criteria. If a trunk group has SABR lists applied, those stations or trunks will then be considered for DNIS matching to that trunk group. The application of the ANI-lists and/or trunk lists to the trunk groups are typically applied in the order they are listed. Once either are applied as permit or deny, an implicit deny is appended to the end.

To allow a trunk that normally delivers calls to the switchboard as an external type to prefer to route to trunks, the command to the trunks "prefer trunks" is established. This command changes the nature of the call routing for calls from that trunk. Trunks that mark the call type as external will route to stations first before attempting to route to trunks. This may not always be desirable as sometimes the system may want to have a local number configured to the same value as a trunk number of an analog line into an IAD, but generally want the call to route out a SIP trunk and to a SoftSwitch first. This would be useful if an administrator wanted the trunk to ring a remote Auto Attendant generally, but in the case the SIP trunk was down to route to a local number.

A voice ANI-list is a list of caller ID templates that can be applied to a trunk group as either permit or deny.

| | |
|---|---|
| (config) # [no] voice ani-list <WORD> | Creates an ani-list by the name provided |
| (config-ani-list-NAME) # [no] ani <TEMPLATE> | TEMPLATE would use the normal dial-plan template characters, M, N, X, 0-9, [ ], —, $, etc. (These characters would be treated exactly the same as in the dial-plan entries.) |

A voice trunk-list in a non-limiting example is a list of voice trunks that can be applied to a trunk group as either permit or deny.

| | |
|---|---|
| (config) # [no] voice trunk-list <WORD> | Creates a trunk-list by the name provided |
| (config-trunk-list-NAME) # [no] trunk T<xx> | Add trunk Txx to the trunk-list. |

A trunk group in a non-limiting example will by default accept all ANI and all Trunks.

| | |
|---|---|
| (config-TRK_GRP_NAME) # [no] permit \| deny proxy | Adds the proxy to the trunk group |
| (config-TRK_GRP_NAME) # [no] permit \| deny list <WORD> | Adds the given ani-list to the trunk group |
| (config-TRK_GRP_NAME) # [no] permit \| deny list <WORD> | Adds the given trunk-list to the trunk group |

In a non-limiting example, the default for permit/deny will be to permit and exclude all others (implicit deny all). The administrator can apply as many ani-lists and trunk-lists to a trunk group as memory will allow. In the show run, a comment will be added when implicit denies are applied (similar to ACLs today).

| | |
|---|---|
| (config-Txx) # [no] prefer trunk-routing | Adds the trunk to a list of trunks to be considered for routing first to other trunks rather than to local configured extensions regardless of system routing mode. |

The default will be 'no prefer trunk-routing' where call routing mode (local or network) and internal versus external call type will dictate the choice for the routing destination. This configuration item will only affect how inbound calls from this trunk are handled.

show run voice ani-list [<WORD>]
show run voice trunk-list [<WORD>]

This feature should be debugged using existing trunk account, trunk group, and switchboard debugging.

The prefer-trunks command will not be flagged. All other development for this feature will be flagged with:
 #define  AOS_INCLUDE_VOICE_TRUNK_ACCESS_ LISTS( ) 1

The implementation of voice ani-lists and voice trunk-lists will require two new tables. This design requires the list dataset to grow in two dimensions:

1) an arbitrary number of individual lists can be created; and
2) an arbitrary number of members can be added to each list.

Since the database in an example ADTRAN Operating System does not support dynamic tables, a dataset like this requires two static tables. The first table, TIS_VOICE_TRUNK_ACCESS_LIST_TABLE, will contain one tuple for each list.

| Column Name | Date Type | Properties | Key |
|---|---|---|---|
| CID_VOICE_TRUNK_ACCESS_LIST_NAME | char [40] | R/O | ∘ |
| CID_VOICE_TRUNK_ACCESS_LIST_TYPE | Enum | R/O | |

This table will be implemented using a SimpleTable and SimpleTuple model. Since all of the columns are read-only, this table will be implemented using RoDataCells and not CellAccessor templates. The getFirst, getNext, insert, and delete functionality for this table will be completely implemented in the subsystem. The table will provide simple wrappers for this functionality. The second table, TID_VOICE_TRUNK_ACCESS_LIST_MEMBER_TABLE, will contain one tuple for each list member of any list.

| Column Name | Date Type | Properties | Key |
|---|---|---|---|
| CID_VOICE_TRUNK_ACCESS_LIST_NAME | char [40] | R/O | ∘ |
| CID_VOICE_TRUNK_ACCESS_LIST_MEMBER | char [40] | R/O | ∘ |

This table will be implemented using the SimpleTable and SimpleTuple model. Since all of the columns are read-only, this table will be implemented using RoDataCells and not CellAccessor templates. The getFirst, getNext, insert, and delete functionality for this table will be completely implemented in the subsystem. The table will provide simple wrappers for this functionality. The implementation of trunk-group permits and denies will require one new table. This table, TID_VOICE_TRUNK_GROUP_ACCESS_LIST_ACTION_TABLE, will contain one tuple for each permit or deny on any trunk group.

| Column Name | Date Type | Properties | Key |
|---|---|---|---|
| CID_TRUNK_GROUP_NAME * | char [40] | R/O | ∘ |
| CID_TRUNK_GROUP_ACTION | enum | R/O | ∘ |
| CID_TRUNK_GROUP_ACCESS_LIST NAME | char [40] | R/O | ∘ |

This table will be implemented using the SimpleTable and SimpleTuple model. Since all of the columns are read-only, this table will be implemented using RoDataCells and not CellAccessor templates. The getFirst, getNext, insert, and delete functionality for this table will be partially implemented in the subsystem. However, this table will be responsible for interfacing directly with each trunk while executing these functions. (Refer to TID_TRUNK_ACCEPT_REJECT for an example of this functionality.) The implementation of prefer-trunks will require modifying one table. The table, TID_TRUNK_ACCOUNT, contain one tuple for each trunk.

| Column Name | Date Type | Properties | Key |
|---|---|---|---|
| CID_PREFER_TRUNKS | Bool | R/W | |

Since this table already exists, this new column will be implemented in a style matching the existing columns in this table.

For ANI Based Routing, the system has knowledge of the original ANI. In a single-box installation where a user blocks their Caller ID, the system still knows the original ANI of the user. In this same situation for a multi-box installation, the other boxes may not know the original ANI of the user. It is possible to use P-Asserted-Identity and/or P-Preferred-Identity on trunks such as a VoIP trunk, for example, SIP between the multiple boxes. For a single-box installation, the system can obtain the identity of the second user to make routing decisions and in an alternative embodiment, it is possible to use SIP diversion or SIP history information in a multi-box installation.

Figure 1B:
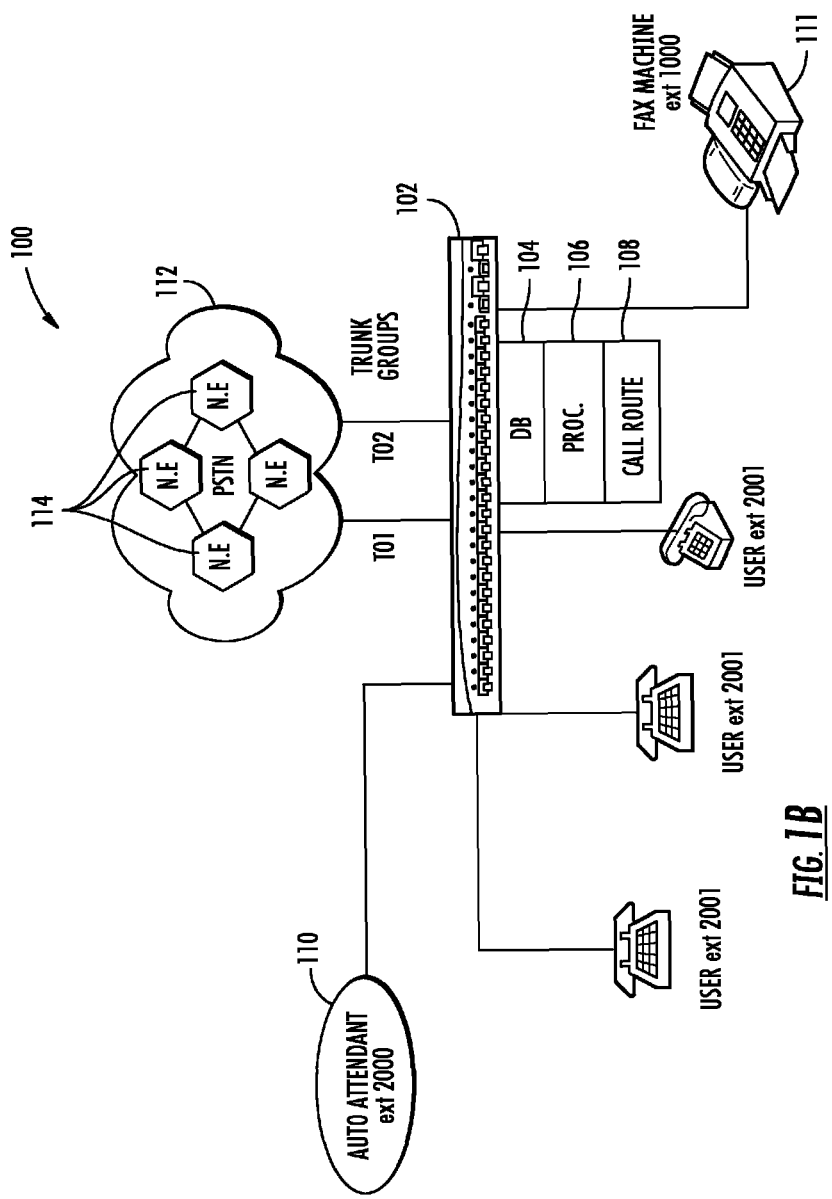
FIG. 1B is a drawing view showing an example configuration in accordance with a non-limiting example.

FIG. 1B is a diagram showing an example configuration and illustrating a communications system at 100 and server 102 as an all-in-one integrated communications platform with switching capability and private branch exchange capability and other functional capabilities and operating as a call routing device. An example of such call routing device is a NetVanta 7000 series device such as the NetVanta 7100. This example call routing device 102 includes appropriate switching and/or routing capability and can operating as a layer 2 switch and in other examples layer 3. It includes a database 104, call router processor 106 and a call router 108. The auto attendant 110 is illustrated as connected into the device together with the Public Switch Telephone Network 112 and two lines as T01 and T02. The device connects to various devices as illustrated with different user extensions and a fax machine.

The PSTN includes a number of network elements 114 that are interconnected together to form the communications network together with network elements such as the call routing device 102 and other network elements that can be included. The auto attendant 110 can be considered a network element. Throughout this description, various networks such as an SIP network and other examples is illustrated and will include various network elements to form the communications network. As illustrated, the call routing device 102 is connected within the communications network 100 and interconnected to the plurality of trunks forming trunk groups. The call routing device includes a database 104 that stores a dialing plan having data related to restrictions as to which outbound trunk from the call routing device 102 can be used based on an originating account as either a station or trunk of a caller or the number of a caller. A call router processor 106 is operative with the database and configured to determine an outbound trunk from the call routing device 102 to which a call from a caller is routed at the call routing device if the configured dial plan permits the originating account or number of the caller to access the selected outbound trunk. A call router 108 is configured to route the call from the caller onto the selected outbound trunk.

In an example, the call router processor 106 is configured to determine that certain callers are specifically allowed to call out a given trunk while all other callers are denied access based on the stored dialing plan. In another example, the call router processor 106 is configured to determine if certain callers are specifically blocked from using a trunk while other callers are permitted to access based on the stored dialing plan. The call router processor 106 is configured to restrict calls to a trunk based on both the dialed number and identity of the caller. In another example, the database 104 comprises data relating to a list of automatic number identification (ANI) templates and the call router processor 106 is configured to apply the list as permit or deny access categories on selected trunk groups. The database comprises data relating to station and trunk configurations in an example. In another example, the database comprises data relating to trunk groups that accept a dialed number identification service (DNIS) and the call router processor is configured to determine a trunk group to which a call is routed based on the DNIS.

In this example, a typical install has two analog trunks feeding the system. Trunk numbers on the inbound T01 go to the auto attendant 110 and trunk number on the inbound T02 goes to the fax machine 111. All users can use both T01 and T02 and the fax machine typically uses T02.

There now follows a pseudo-code example for functionality of the call routing device with reference to the system shown in FIG. 1B.

```
Voice ani-list AllUsers
    Ani MXXX
voice ani-list FAX
    ani 1XXX
voice trunk-list AllTrunks
    trunk T01
    trunk T02
voice trunk T01 type analog supervision loop-start
    blind-dial
    no reject-external
    caller-id
    trunk-number 2000
    connect fxo 0/1
    rtp delay-mode adaptive
voice trunk T02 type analog supervision loop-start
    blind-dial
    no reject-external
    caller-id
    trunk-number 1000
    connect fxo 0/2
    rtp delay-mode adaptive
voice grouped-trunk ALL-USERS
    description "The system directory"
    trunk T01
    trunk T02
    accept 1-NXX-NXX-XXXX cost 0
    accept NXX-XXXX cost 0
    deny ani-list FAX
    permit ani-list AllUsers
    permit trunk-list AllTrunks
voice grouped-trunk FAX
    description "The system directory"
    trunk T02
    accept 1-NXX-NXX-XXXX cost 0
    accept NXX-XXXX cost 0
    permit ani-list FAX
voice autoattendant "DefaultAA" extension 2000
    entry-filename "defaultAA.xml"
```

Figure 2:
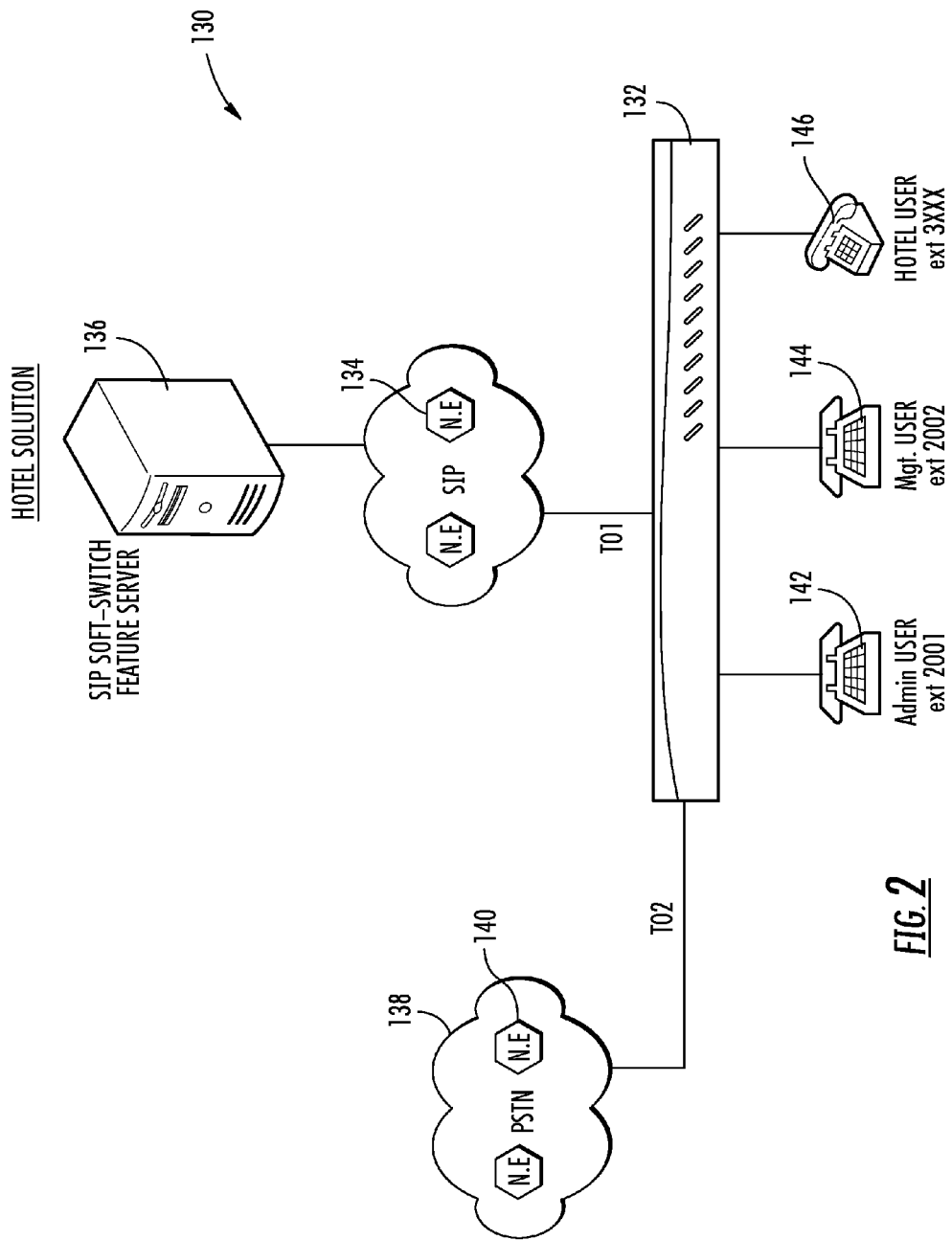
FIG. 2 is a drawing view showing a hotel configuration in accordance with a non-limiting example.

FIG. 2 shows a diagram for a communications network 130 similar to that in FIG. 1 such as used for a hotel solution that includes a call routing device 132 that includes components similar as described with the call routing device of FIG. 1B and connected to a SIP network 134 and SIP soft-switch server 136. An example call routing deice is a TA-924E Integrated Access Device by ADTRAN, INC. The SIP softswitch feature server 136 connects into the SIP network 134 in this example. The call routing device 132 and also connects to the PSTN 138 with network elements 140 and connects to devices that include an administrative user 142, management user 144 and hotel user 146 such as a potential caller staying at the hotel.

Users are registered to the SIP soft-switch and feature server via a proxy. The soft-switch allows or disallows calls and call types based on class of service for the user calling. In a failover mode, the end user will have any administrator and management members of a hotel allowed to make all calls out of the local PSTN trunk. In a failover mode, the end user will like to restrict normal customers to local and emergency calls.

A pseudo-code example relative to the operation of the system shown in FIG. 2 is now set forth below.

```
voice ani-list Customers
    ani 3XXX
voice ani-list Admin/Mgt
    ani 2XXX
voice trunk T01 type sip
    no reject-external
    sip-server primary <SERVER FQDN>
    registrar primary <SERVER FQDN>
voice trunk T02 type analog supervision loop-start
    blind-dial
    no reject-external
    caller-id
    trunk-number 2000
    connect fxo 0/1
    rtp delay-mode adaptive
voice grouped-trunk ALL-USERS
    trunk T01
    accept 1-NXX-NXX-XXXX cost 0
    accept NXX-XXXX cost 0
    accept MXXX cost 0
voice grouped-trunk Customers
    trunk T02
    accept 911 cost 10
    accept NXX-XXXX cost 10
    permit ani-list Customers
    ! deny all non permitted trunks
    ! deny all non permitted ani
voice grouped-trunk Admin/Mgt
    trunk T02
    accept $ cost 10
    permit ani-list Admin/Mgt
    ! deny all non permitted trunks
    ! deny all non permitted ani
```

Figure 3:
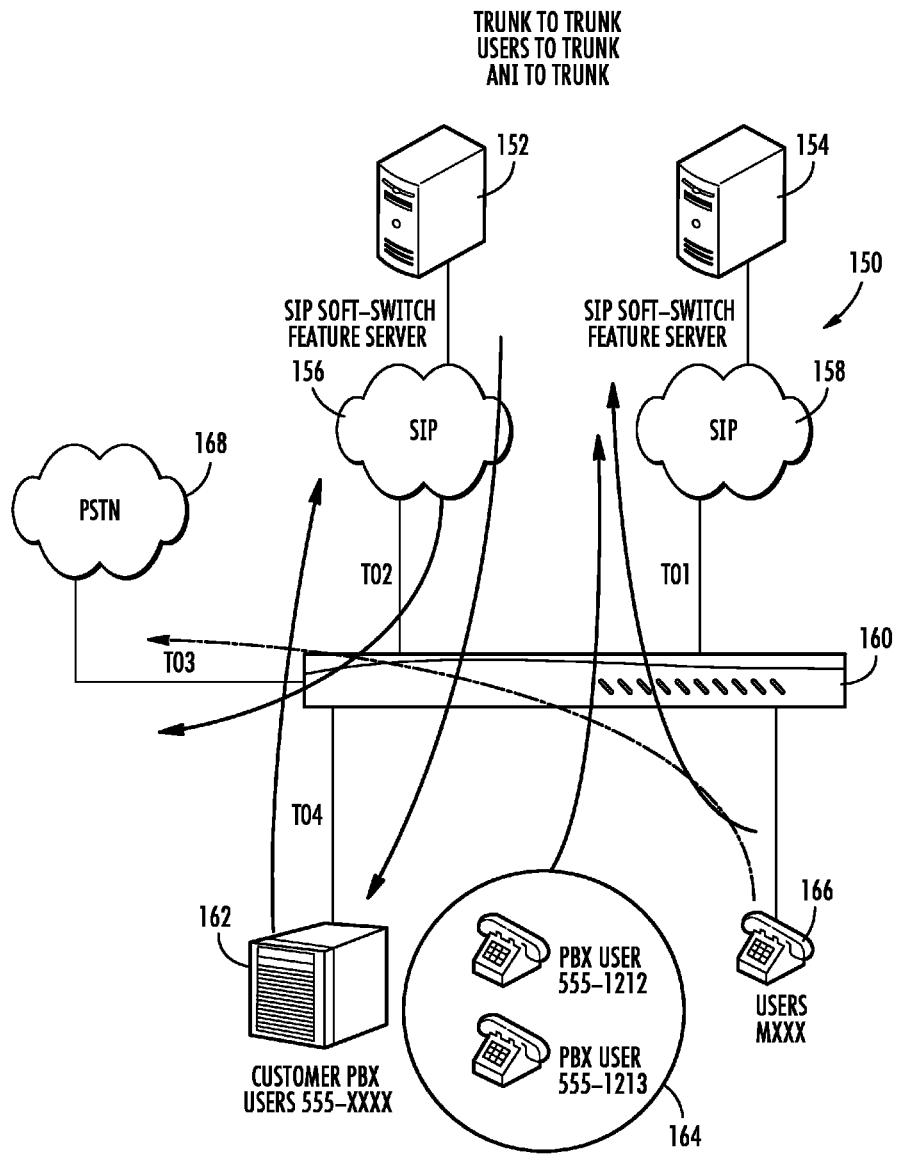
FIG. 3 is a drawing view showing a trunk-to-trunk and users-to-trunk and ANI-to-trunk configuration in accordance with a non-limiting example.

FIG. 3 is a diagram showing a communications system and showing a communications network 150 for trunk-to-trunk, users-to-trunk, and ANI-to-trunk with various components illustrated, including respective SIP soft-switch feature servers 152, 154 connected through respective SIP networks 156, 158 to the Integrated Access Device operating as the call routing device 160, for example, a TA-924E manufactured by ADTRAN, INC. A customer PBX 162 connects to the device 160 as well as PBX users 164 and regular users 166. The device connects into the PSTN 168 as illustrated.

All calls are allowed from the customer PBX 162 to go out line T02 to the soft-switch 152. All locally configured users go out T01 to the soft-switch 154. Particular users are allowed on the customer PBX 162 to go out line T01 to the soft-switch. T02 line is allowed to route back to local PSTN trunk T03. Local users 166 are allowed to dial out T03 as a back-up. Calls from line T02 can be routed to the customer PBX 162 on line T04.

There now follows a pseudo-code example for the network 150 shown in FIG. 3.

```
voice ani-list LocalUsers
    ani MXXX
```

-continued

```
    voice ani-list SpecialUsers
        ani 555-1212
        ani 555-1213
    voice trunk-list PBX
        trunk T04
    voice trunk-list SIPT1
        trunk T01
    voice trunk-list SIPT2
        trunk T02
    voice trunk-list Local
        trunk T04
    voice trunk T01 type sip
        no reject-external
        sip-server primary <SERVER FQDN>
        registrar primary <SERVER FQDN>
    voice trunk T02 type sip
        no reject-external
        sip-server primary <SERVER FQDN>
        registrar primary <SERVER FQDN>
    voice trunk T03 type analog supervision loop-start
        blind-dial
        no reject-external
        caller-id
        trunk-number 2000
        connect fxo 0/1
        rtp delay-mode adaptive
    voice trunk T04 type isdn
        resource-selection circular descending
        no reject-external
        connect isdn-group 1
        rtp delay-mode adaptive
    voice grouped-trunk SS1
        trunk T01
        accept 1-NXX-NXX-XXXX cost 0
        accept NXX-XXXX cost 0
        accept MXXX cost 0
        permit ani-list LocalUsers
        permit ani-list SpecialUsers
        permit trunk-list SIPT1
        permit trunk-list Local
        deny trunk-list PBX
        deny trunk-list SIPT2
        ! deny all non permitted trunks
        ! deny all non permitted ani
    voice grouped-trunk Local Access
        trunk T03
        accept 1-NXX-NXX-XXXX cost 10
        accept NXX-XXXX cost 10
        accept MXXX cost 10
        permit ani-list LocalUsers
        permit trunk-list SIPT2
        ! deny all non permitted trunks
        ! deny all non permitted ani
    voice grouped-trunk SS2
        trunk T02
        accept 1-NXX-NXX-XXXX cost 0
        accept NXX-XXXX cost 0
        accept MXXX cost 0
        deny ani-list LocalUsers
        permit trunk-list PBX
        permit trunk-list SIPT2
        ! deny all non permitted trunks
        ! deny all non permitted ani
    voice grouped-trunk PBX
        trunk T04
        accept 555-XXXX cost 0
        deny ani-list LocalUsers
        permit trunk-list PBX
        permit trunk-list SIPT2
        ! deny all non permitted trunks
        ! deny all non permitted ani
```

Figure 4:
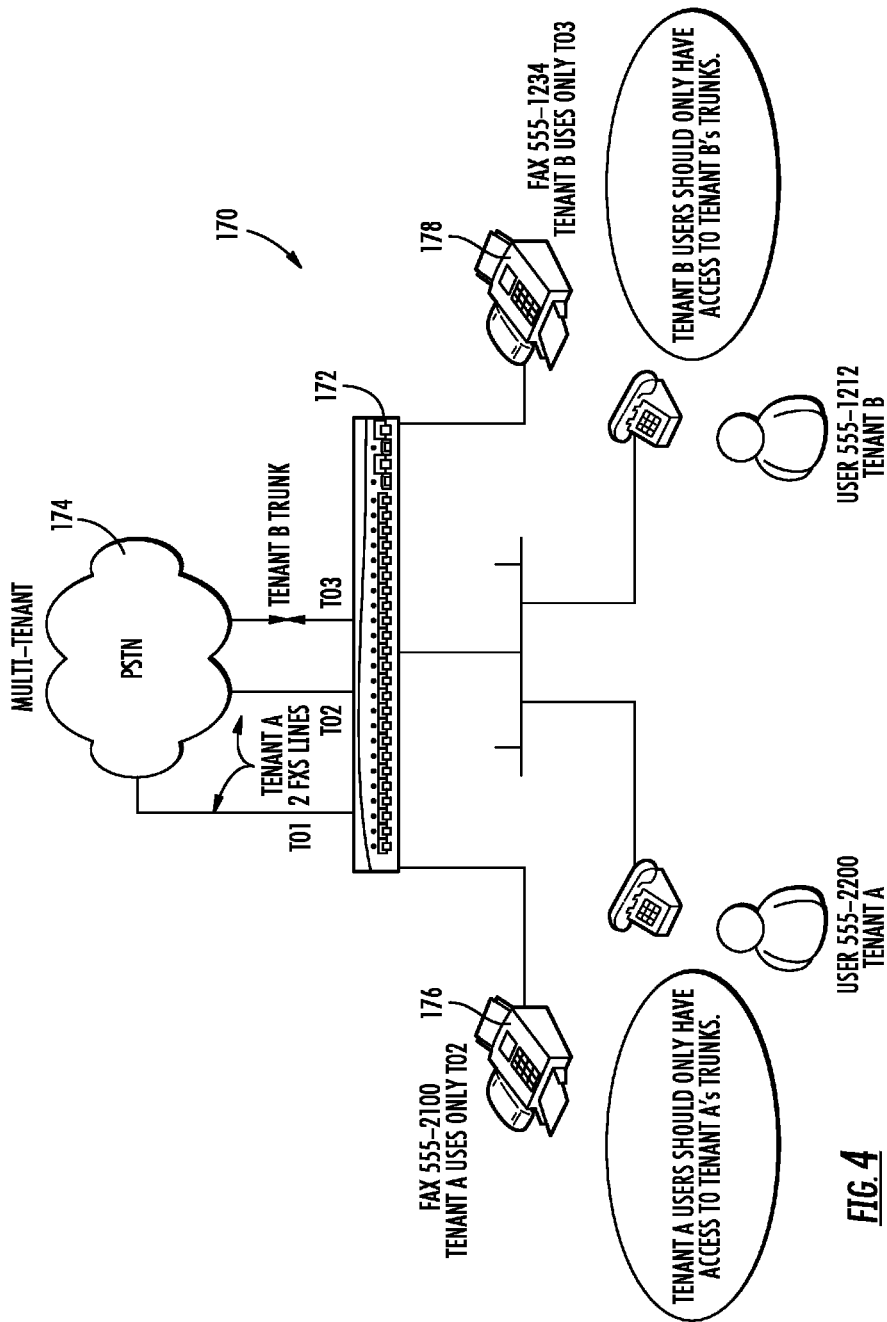
FIG. 4 is a drawing view showing a multi-tenant configuration in accordance with a non-limiting example.

A multi-tenant example is illustrated in FIG. 4. The network 170 includes the call routing device 172 (for example, a NV7100) such as shown in FIG. 1 and connected to the PSTN 174 and connects to Tenants A and B fax machines 176, 178 and two tenants as Tenant A and B as illustrated. Tenant A users should only have access to Tenant A's trunks, and Tenant B users should only have access to Tenant B's trunks. Tenant A also uses only line T02 and Tenant B uses only line T03 at the fax. Tenant A in this example has two FXS lines.

In this example, the system as a network 170 would configure at least two trunk groups on the device 172. One for Tenant A is TG UNITA and contains T01 and T02 and one for Tenant B is TG UNITE that contains T03. It should be understood that if this device 172 is in a local mode, users on A and users on B can each call each other independently. The system 170 configures a user-list with all Tenant A users and configures a user-list with all Tenant B users. The user-list A is applied to TG UNITA and the user-list B is applied to TG UNITB.

There now follows a pseudo-code example for the network 170 example shown in FIG. 4.

```
    voice ani-list TenantAUsers
        ani 555-2XXX
    voice ani-list TenantAFAX
        ani 555-2100
    voice ani-list TenantBUsers
        ani 555-1XXX
    voice trunk-list TenantATrunks
        trunk T01
        trunk T02
    voice trunk-list TenantBTrunks
        trunk T03
    voice trunk T01 type analog supervision loop-start
        blind-dial
        no reject-external
        caller-id
        trunk-number 2000
        connect fxo 0/1
        rtp delay-mode adaptive
    voice trunk T02 type analog supervision loop-start
        blind-dial
        no reject-external
        caller-id
        trunk-number 2000
        connect fxo 0/2
        rtp delay-mode adaptive
    voice trunk T03 type isdn
        resource-selection circular descending
        no reject-external
        connect isdn-group 1
        rtp delay-mode adaptive
    voice grouped-trunk TenantA
        trunk T01
        trunk T02
        accept 1-NXX-NXX-XXXX cost 0
        accept NXX-XXXX cost 0
        permit ani-list TenantBUsers
        deny ani-list TenantAFax
        permit trunk-list TenantATrunks
        ! deny all non permitted trunks
        ! deny all non permitted ani
    voice grouped-trunk TenantAFax
        trunk T02
        accept 1-NXX-NXX-XXXX cost 0
        accept NXX-XXXX cost 0
        permit ani-list TenantAFax
        ! deny all non permitted trunks
        ! deny all non permitted ani
    voice grouped-trunk TenantB
        trunk T03
        accept 1-NXX-NXX-XXXX cost 0
        accept NXX-XXXX cost 0
        permit ani-list TenantBUsers
        permit trunk-list TenantBTrunks
        ! deny all non permitted trunks
        ! deny all non permitted ani
```

Figure 5:
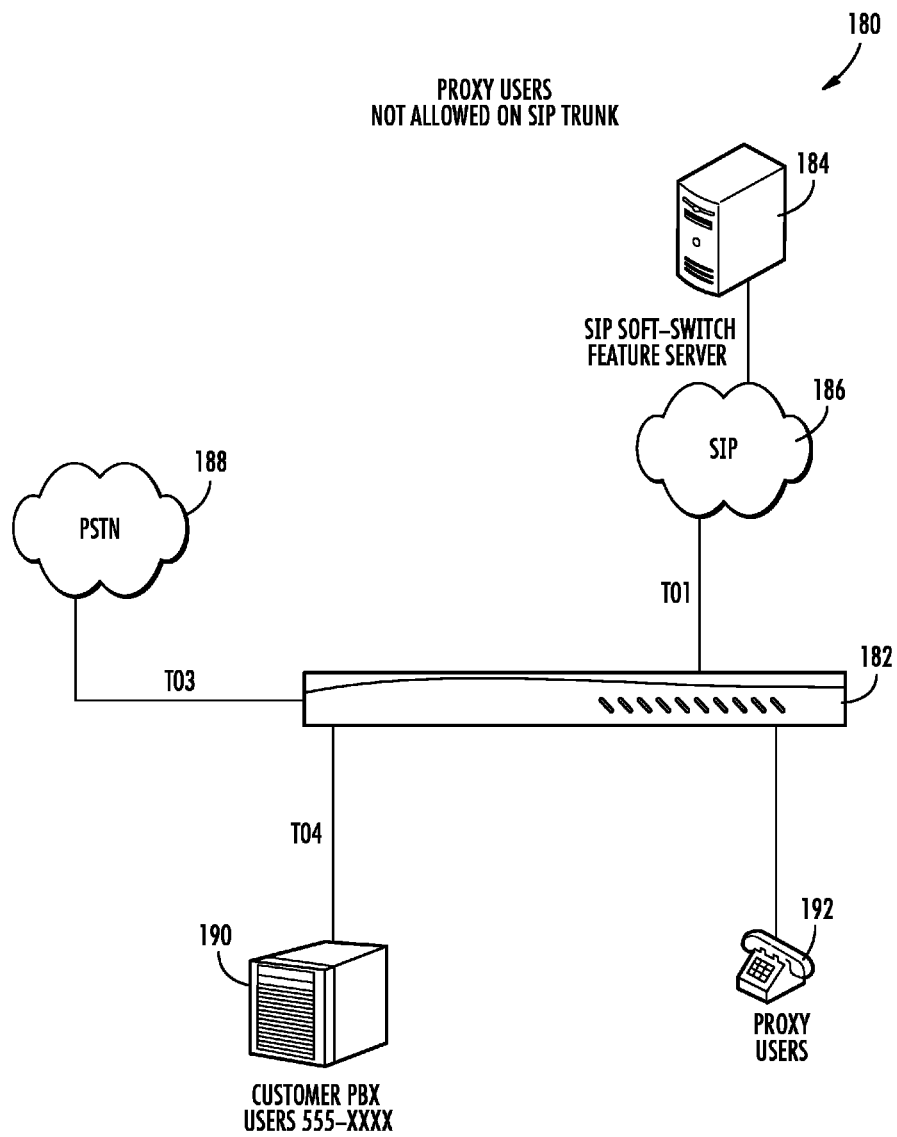
FIG. 5 is a drawing view showing an example configuration where proxy users are not allowed on the SIP trunk in accordance with a non-limiting example.

FIG. 5 shows a diagram for a communications network 180 showing where proxy users are not allowed on an SIP trunk. The Integrated Access Device as a call routing device 182 (for example a TA-924E) is connected to an SIP soft-switch feature server 184 through the SIP network 186 and connects to the PSTN 188 and a customer PBX 190 and proxy users 192. Calls are allowed from the customer PBX 190 to go out line T01 to the soft-switch 184. Proxy users should not route to line T01 on failover, but can use the local PSTN 188.

A pseudo-code example for the network configuration shown in FIG. 5 is now set forth.

```
voice trunk-list SIP
    trunk T01
Voice trunk-list Local
    trunk T03
voice trunk-list PBX
    trunk T04
voice trunk T01 type sip
    no reject-external
    sip-server primary <SERVER FQDN>
    registrar primary <SERVER FQDN>
voice trunk T03 type analog supervision loop-start
    blind-dial
    no reject-external
    caller-id
    trunk-number 2000
    connect fxo 0/1
    rtp delay-mode adaptive
voice trunk T04 type isdn
    resource-selection circular descending
    no reject-external
    connect isdn-group 1
    rtp delay-mode adaptive
voice grouped-trunk NormalSIP
    trunk T01
    accept 1-NXX-NXX-XXXX cost 0
    accept NXX-XXXX cost 0
    deny proxy
    permit trunk-list PBX
    permit trunk-list SIP
    permit trunk-list Local
    ! deny all non permitted trunks
    ! deny all non permitted ani
voice grouped-trunk LocalPSTN
    trunk T03
    accept 1-NXX-NXX-XXXX cost 10
    accept NXX-XXXX cost 10
```

FIG. 6 shows a multi-site installation for a network 200 that restricts users to certain outbound trunks. A call routing device 202, such as a NetVanta 7100 communications server, connects to City 1 PSTN 204 and local users 206 and is connected to first and second Integrated Access Devices as call routing devices 210, 212 (e.g., TA900's manufactured by ADTRAN, INC.) that connect to respective PSTN's 214, 216 for City 2 and City 3. The first call routing device 210 connects to various proxy users 220, local users 222 and a local fax machine 224 and has local exchanges as indicated. The second call routing device 212 connects to City 3 PSTN 216 and connects to proxy users 230 and has local exchanges as indicated.

Attached users on the communications server as a call routing device 202 have external calls going to line T01 and call remote users via SIP trunks (when supported) as line T02 and line T03. Attached users on the first call routing device 210 for City 2 use T04 for local calls and T02 for long distance and remote user calls. Remote users use line T02 or line T03 to connect to the call routing device extensions and long distance at the headquarters. Proxy users of City 2 should use line T04 for local calls and proxy users at City 3 should use line T05 for local calls. The fax machine at City 2 should always use line T04 and never line T02.

There now follows a pseudo-code example for the configurations for City 1 for the call routing device 202 and the call routing device 210 for City 2 and call routing device 212 for City 3.

Call Routing Device 202
City 1 Config

```
voice ani-list LocalUsers
    ani 2XXX
voice ani-list City2ProxyUsers
    ani 3XXX
voice ani-list City3ProxyUsers
    ani 5XXX
voice ani-list City2Users
    ani 4XXX
voice trunk-list LocalPSTNTrunk
    trunk T01
voice trunk-list Remotes
    trunk T02
    trunk T03
voice trunk T01 type isdn
    resource-selection circular descending
    no reject-external
    connect isdn-group 1
    rtp delay-mode adaptive
voice trunk T02 type sip
    no reject-external
    sip-server primary <SERVER FQDN>
    registrar primary <SERVER FQDN>
voice trunk T03 type sip
    no reject-external
    sip-server primary <SERVER FQDN>
    registrar primary <SERVER FQDN>
voice group-trunk LocalEmergency
    trunk T01
    accept 911 cost 0
    permit ani-list LocalUsers
    ! deny all non permitted trunks
    ! deny all non permitted ani
voice group-trunk LocalUse
    trunk T01
    accept 1-NXX-NXX-XXXX cost 0
    accept NXX-XXXX cost 0
    permit ani-list LocalUsers
    permit trunk-list LocalPSTNTrunk
    ! deny all non permitted trunks
    ! deny all non permitted ani
voice grouped-trunk LocalPSTNForRemotes
    trunk T01
    accept NXX-XXXX cost 0
    reject 256$
    reject 205$
    reject 334$
    reject 306$
    reject 345$
    reject 456$
    reject 567$
    reject 678$
    permit ani-list City2ProxyUsers
    permit ani-list City3ProxyUsers
    ! deny all non permitted trunks
    ! deny all non permitted ani
voice grouped-trunk LongDistancePSTNForRemotes
    trunk T01
    accept 1-NXX-NXX-XXXX cost 0
    permit ani-list City2ProxyUsers
    permit ani-list City3ProxyUsers
    permit ani-list City2Users
    ! deny all non permitted trunks
    ! deny all non permitted ani
voice grouped-trunk city2ProxyCalls
    trunkT02
    accept 911
    accept 256$
    accept 205$
    accept 334$
    accept 306$
    permit ani-list City2ProxyUsers
    ! deny all non permitted trunks
    ! deny all non permitted ani
voice grouped-trunk city3ProxyCalls
    trunkT03
    accept 911
```

```
    accept 345$
    accept 456$
    accept 567$
    accept 678$
    permit ani-list City3ProxyUsers
    ! deny all non permitted trunks
    ! deny all non permitted ani
voice grouped-trunk city2UsersFromHQ
    trunkT02
    accept 4XXX
    permit ani-list LocalUsers
    permit ani-list City2Users
    permit ani-list City2ProxyUsers
    permit ani-list City3ProxyUsers
    permit trunk-list LocalPSTNTrunk
    ! deny all non permitted trunks
    ! deny all non permitted ani
voice grouped-trunk city3UsersFromHQ
    trunkT02
    accept 5XXX
    permit ani-list LocalUsers
    permit ani-list City2Users
    permit ani-list City2ProxyUsers
    permit ani-list City3ProxyUsers
    permit trunk-list LocalPSTNTrunk
    ! deny all non permitted trunks
    ! deny all non permitted ani
```

Call Routing Device 210
City 2 Config

```
        voice ani-list City2Users
            ani 4[0-4] XX
            ani 4[6-9] XX
            ani 450 [1-9]
            ani 45 [1-9] X
        voice ani-list City2FAX
            ani 4500
        voice ani-list City2ProxyUsers
            ani 3XXX
        voice trunk-list MyTrunks
            trunk T02
            trunk T04
        voice trunk T02 type sip
            no reject-external
            sip-server primary <SERVER FQDN>
            registrar primary <SERVER FQDN>
        voice trunk T04 type isdn
            resource-selection circular descending
            no reject-external
            connect isdn-group 1
            rtp delay-mode adaptive
        voice grouped-trunk Emergency
            trunkT04
            permit ani-list City2Users
            permit ani-list City2FAX
            permit ani-list City2ProxyUsers
            accept 911
        voice grouped-trunk Local
            trunkT04
            accept 256$
            accept 205$
            accept 334$
            accept 306$
            permit ani-list City2Users
            permit ani-list City2FAX
            permit ani-list City2ProxyUsers
            permit trunk-list MyTrunks
            ! deny all non permitted trunks
            ! deny all non permitted ani
        voice grouped-trunk FaxLongDistance
            trunkT04
            accept 1-NXX-NXX-XXXX
            permit ani-list City2FAX
            ! deny all non permitted trunks
            ! deny all non permitted ani
```

```
        voice grouped-trunk RemoteUsers
            trunkT02
            accept 2XXX
            accept 5XXX
            permit ani-list City2Users
            permit ani-list City2ProxyUsers
            permit trunk-list MyTrunks
            ! deny all non permitted trunks
            ! deny all non permitted ani
        voice grouped-trunk RemotePSTNandLongDistance
            trunkT02
            accept NXX-XXX
            accept 1-NXX-NXX-XXXX
            permit ani-list City2Users
            permit trunk-list MyTrunks
            ! deny all non permitted trunks
            ! deny all non permitted ani
```

Call Routing Device 212
City 3 Config

```
        voice ani-list City3ProxyUsers
            ani 5XXX
        voice trunk-list MyTrunks
            trunk T02
            trunk T04
        voice trunk T03 type sip
            no reject-external
            sip-server primary <SERVER FQDN>
            registrar primary <SERVER FQDN>
        voice trunk T05 type isdn
            resource-selection circular descending
            no reject-external
            connect isdn-group 1
            rtp delay-mode adaptive
        voice grouped-trunk PSTN
            trunkT05
            accept 911
            accept 345$
            accept 456$
            accept 567
            accept 678$
        voice group-trunk LongDistance
            trunk T03
            accept $ cost 10
```

Figure 7A:
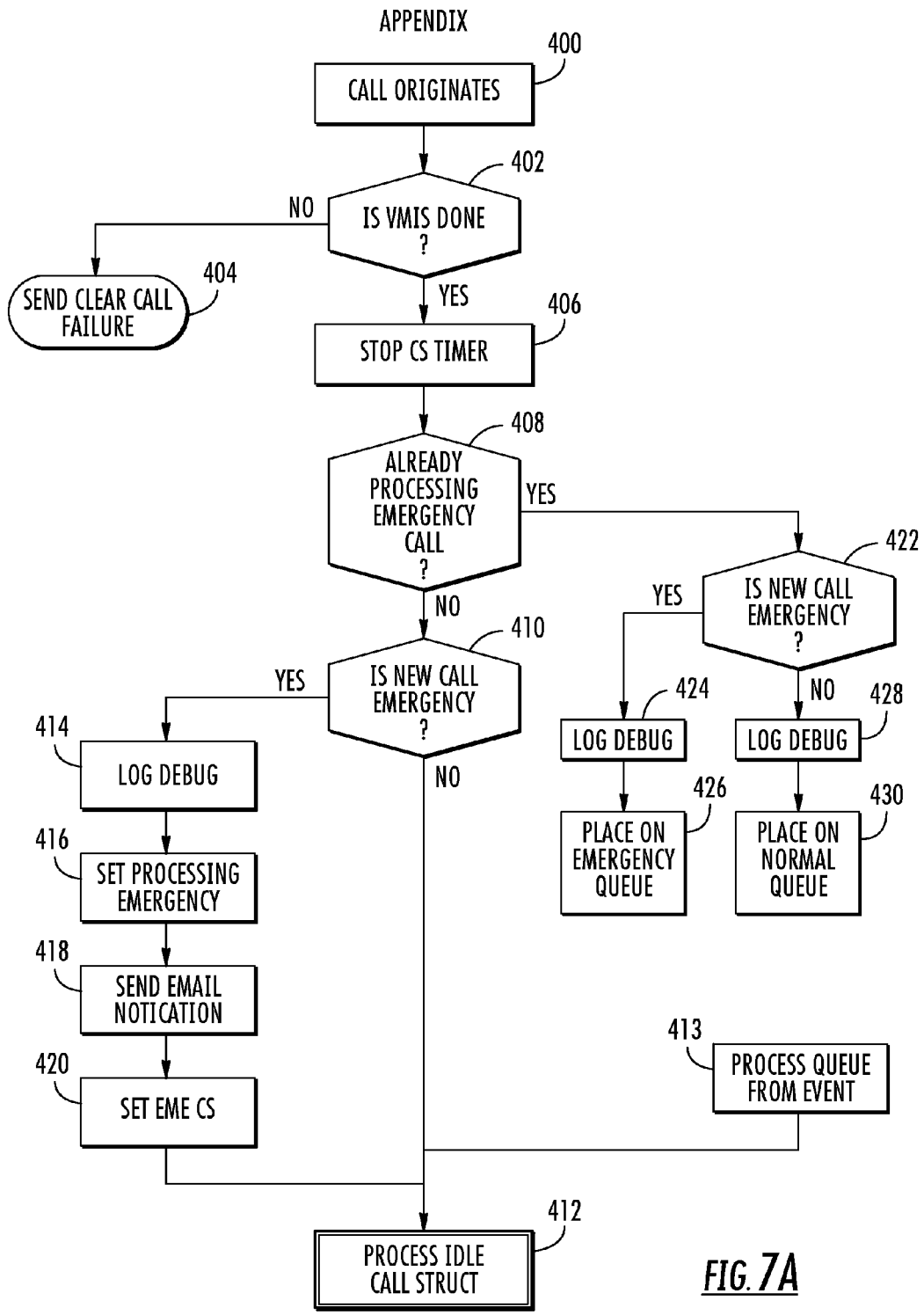
FIGS. 7A-7E are an example method in accordance with a non-limiting example.
Figure 7B:
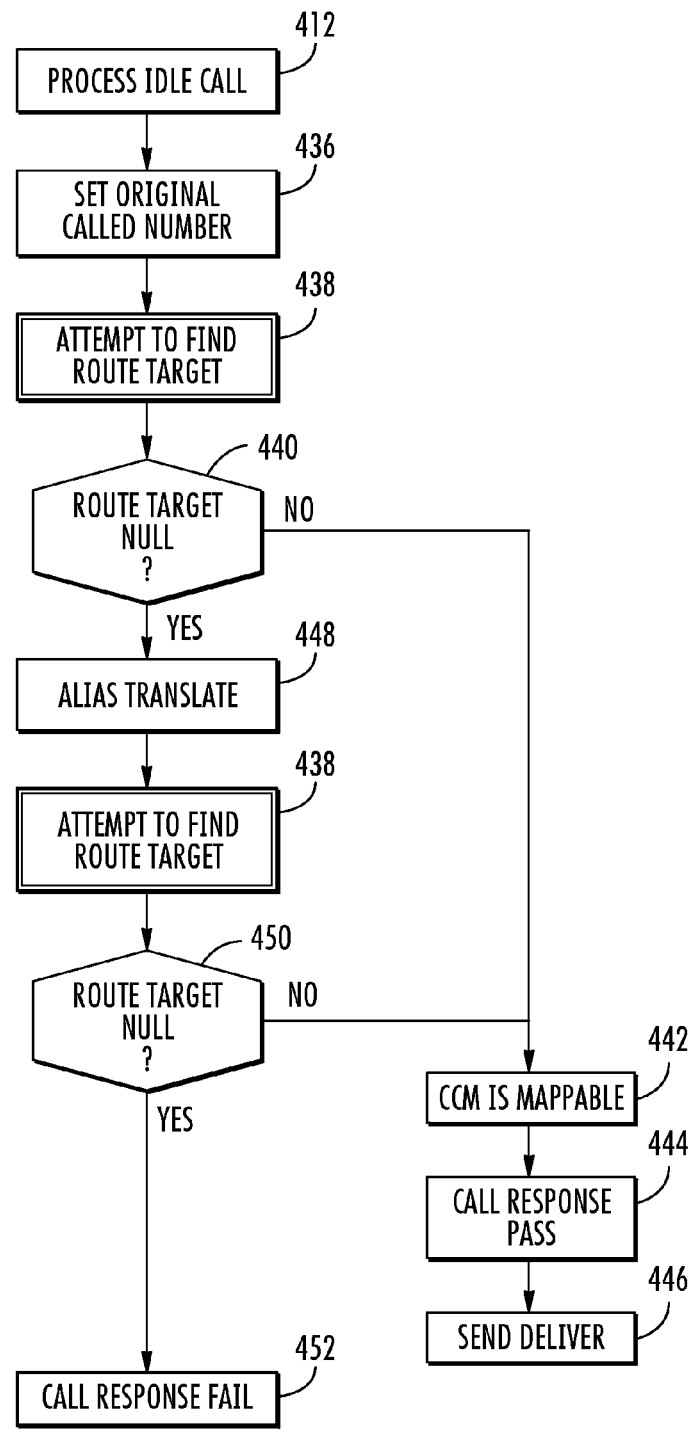

Referring now to FIGS. 7A through 7E, there is illustrated a high-level flowchart and sequence of steps in a processing example in accordance with a non-limiting example. As illustrated, the call originates (block 400) and a determination is then made if the VMIS (Voice Mail Information System) is done (block 402). If not, a clear call failure is sent (block 404). If the VMIS is done, the CS timer is stopped (block 406). A determination is made if the system is processing an emergency call (block 408). If not, another determination is made if the new call is an emergency (block 410). If not, the system goes to the next routine as a process idle call structure (412) as shown in FIG. 7B. If the new call is an emergency, a log debug occurs (block 414) followed by set processing emergency (block 416) and sending an email notification (block 418) and setting the EME CS (block 420) as Emergency Call Struct. The process then continues to process the idle call structure (block 412).

If the system already is processing an emergency call, a determination is made if the new call is an emergency (block 422). If yes, the log debug occurs (block 424) and the call is placed on the emergency queue (block 426). If the new call is not an emergency, log debug occurs (block 428) and the call is placed on the normal queue (block 430). When an emergency call is queued by block 426 or a non-emergency call is queued by block 430, those calls still need to be processed by block 412 at some later point in time. Block 413 shows that these calls can later be de-queued by an "event" and processed at that later point in time.

FIG. 7B shows the process at a call routine (block 412). Transfer calls are not intentionally shown in this sequence shown in FIG. 7B. More processing can take place in delivering if first deliver fails. This is not shown because changes do not effect that portion of code.

The original called number is set (block 436) and another routine is established as an attempt to find the route target (block 438). This routine attempt to find route target is shown in detail in FIG. 7C. A determination is made if the route target is null (block 440) and if not, then the CCM is mappable (block 442) and the call response passes (block 444) and the send deliver occurs (block 446). If the route target null is yes, an alias translate occurs (block 448) and the routine for the attempt to find the route target occurs (block 438). A determination is made if the route target is null (block 440) and if not, the routine for the functions as shown in blocks 452, 444 and 446 are followed. If yes, a call response fail occurs (block 442).

Figure 7C:
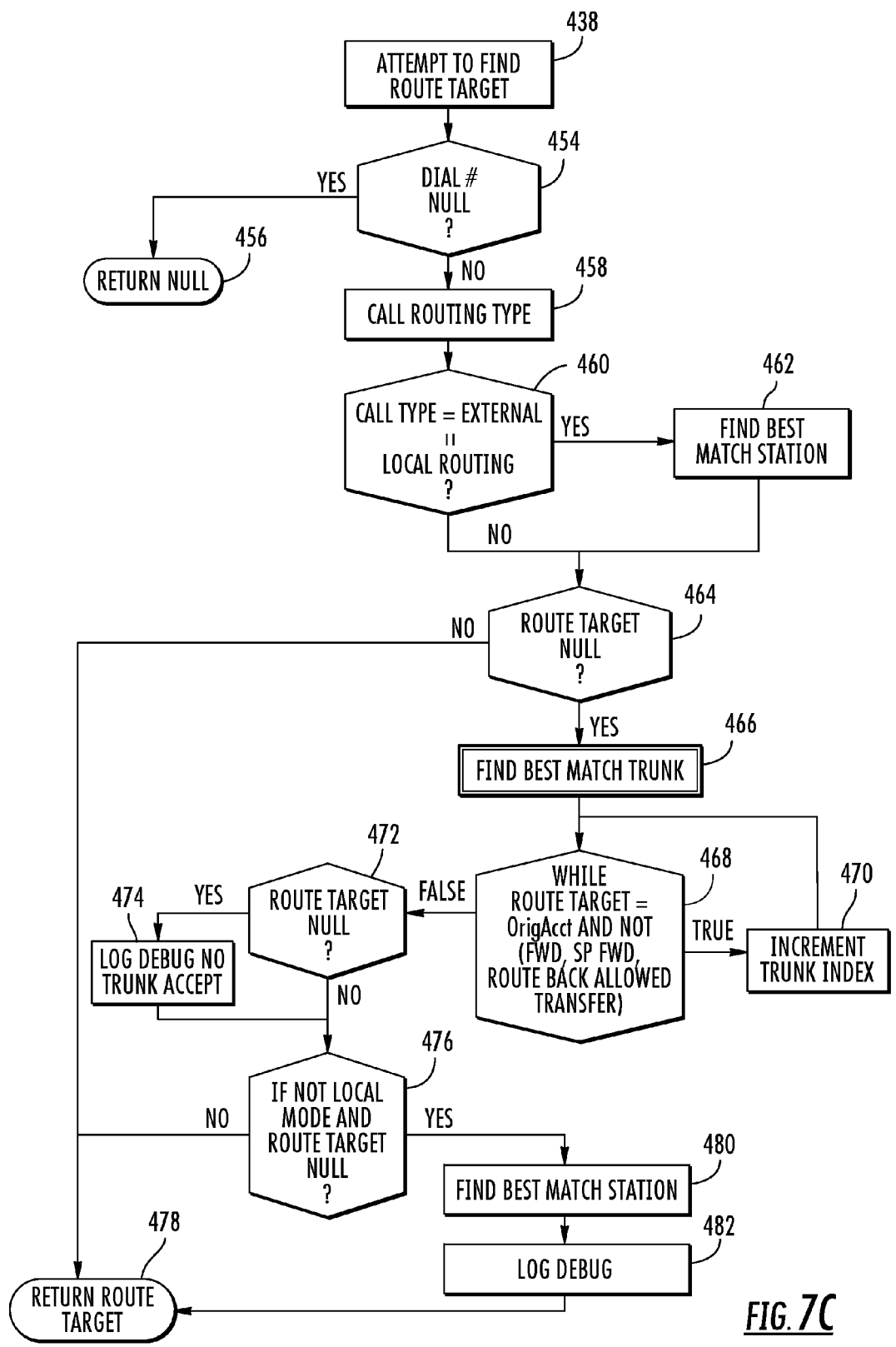

The attempt to find route target routine is shown in FIG. 7C and a determination is made if the dial number is null (block 454). If yes, a null is returned (block 456). This block function will change for the trunks that prefer trunks so that it will override the call routing mode and the external call type routing and go directly to find the best match trunk below. If the dial number null determination is no, then the call routing type is determined (block 458). A determination is made at block 460 for the call type as external or local routing. If yes, a best match station is found (block 462). If not, a determination is made for the route target null (block 464) and if not, the route target is returned (block 478). If yes, a routine is accomplished for the find the best match trunk (block 466), which is further shown in FIG. 7B. A determination is made at block 468 whether the route target is for the originating account and this is such that the system does not automatically reroute the call back to the interface it came from unless it is a forwarded, transfer or the PRI says route back is allowed. Additionally, this location choosing to attempt to route the stations after trunks have not accepted the call will need to be called if the system bypasses the find best match station earlier. If true, then the trunk index is incremented (block 470) and if false, a determination is made for the route target null (block 472). If yes, then the log debug for no trunk accepted occurs (block 474) and if not, then a determination is made concerning the route target null in the local mode. If not, the route target is returned (block 478) and if yes, the best match station is found (block 480) and the debug log occurs (block 482).

Figure 7D:
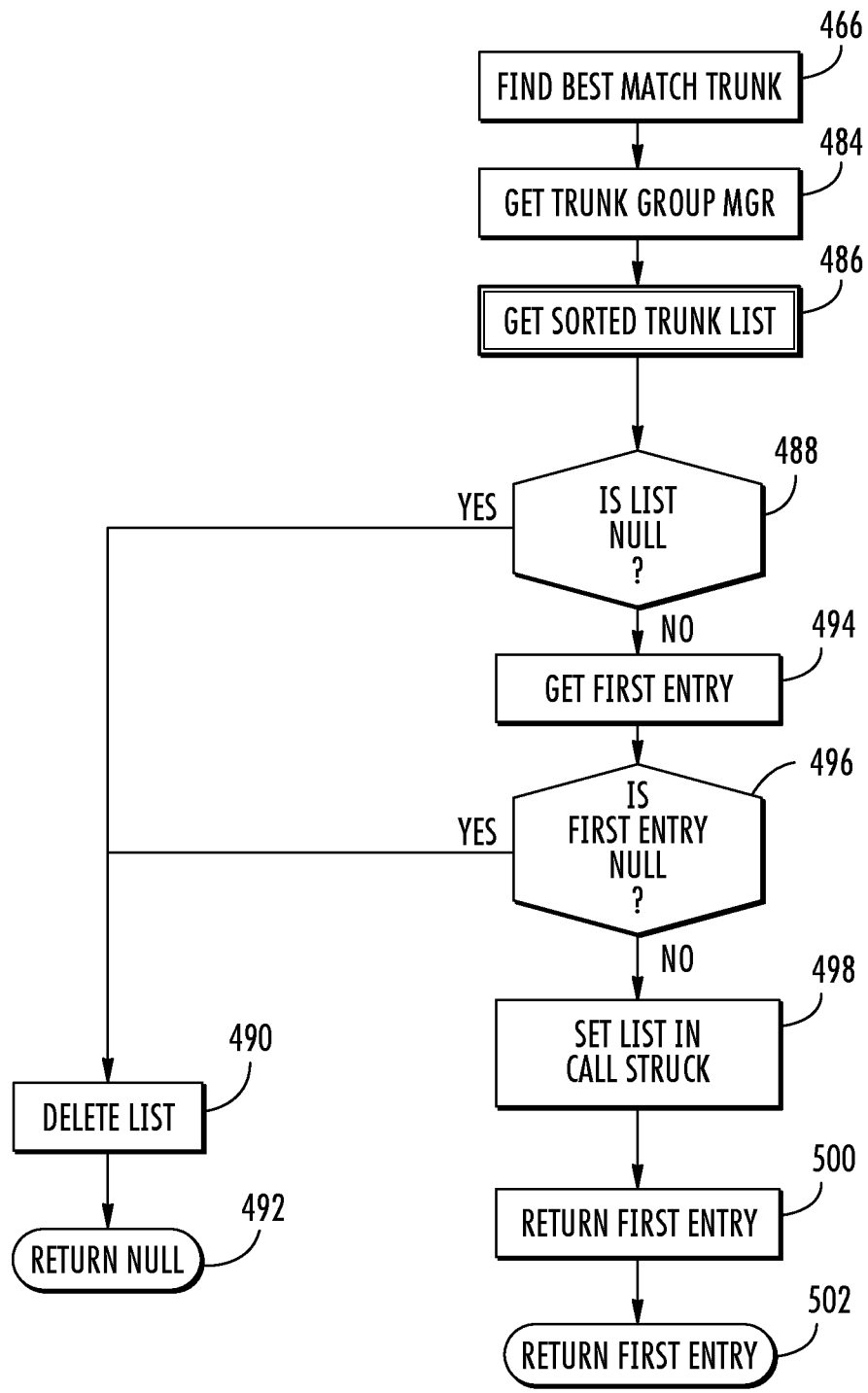

The find best match routine (block 466) is shown in FIG. 7D. The get trunk group manager occurs at block 484 and a subroutine for the get sorted trunk list occurs at block 486. A determination is made if the list is null (block 488). If yes, then a delete list occurs (block 490) with a return null (block 492). If the list null is no, then a get first entry occurs (block 494). A determination is made if the first entry is null (block 496) and if yes, then the delete list and return null steps of blocks (490 and 492) occur. If not, then the list in the call structure is set (block 498) and the first entry return (block 500) and the first entry return (block 502).

Figure 7E:
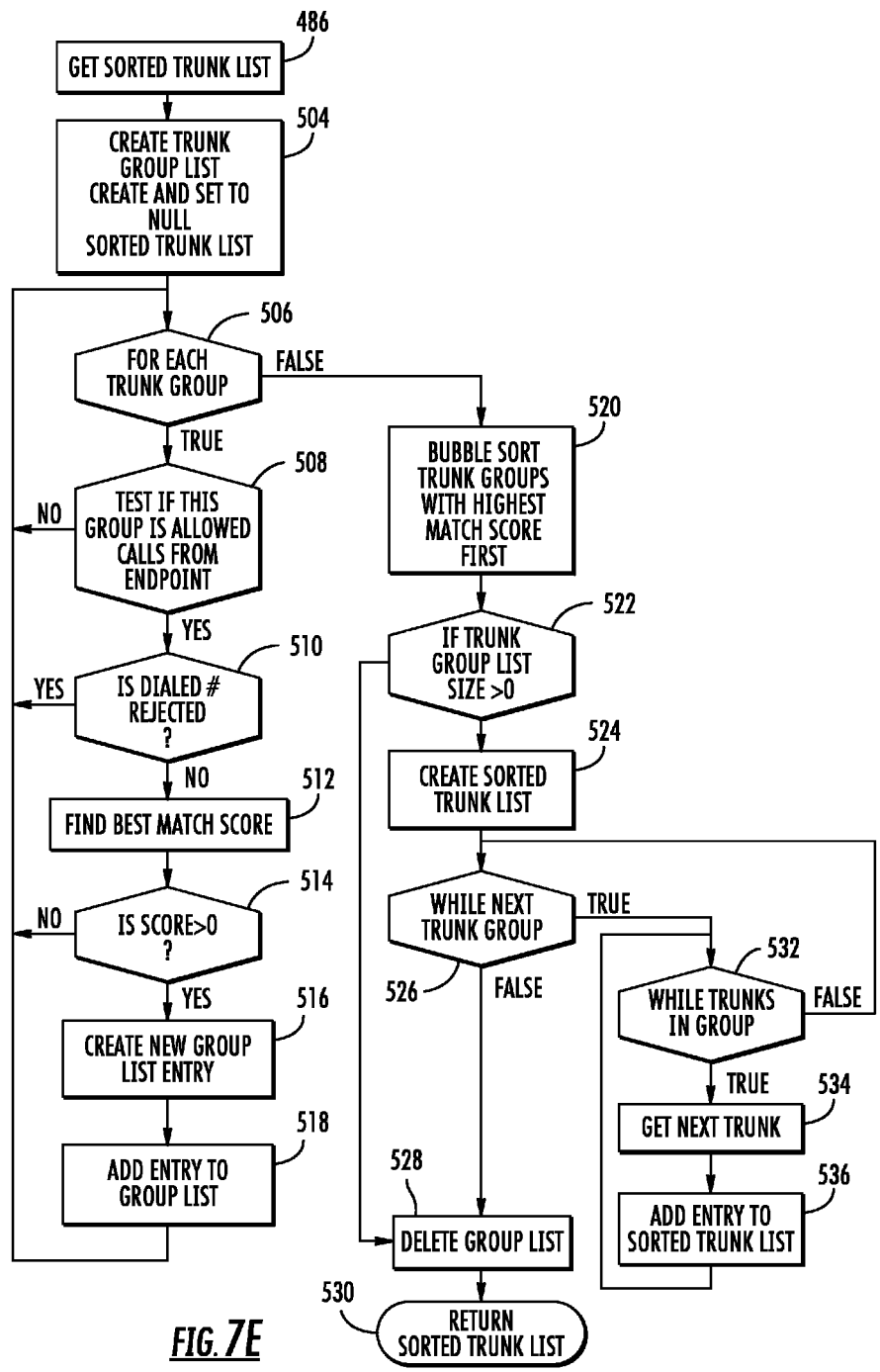

FIG. 7E shows the get sorted trunk list routine (block 486). A create trunk group list and a create and set null for the sorted trunk list occurs (block 504). A determination is made for each trunk group (block 506) and if true, then a test occurs if this group is allowed calls from endpoint (block 508). If not, there is a loop back. If yes, a determination is made if the dialed number was rejected (block 510) and if yes, there is a loop back and if not, a best match score is found (block 512). A determination is made if the score is greater than zero (block 514) and if not, there is a loop back. If yes, a new group list entry is created (block 516) and the entry is added to the group list (block 518). If for each trunk group it is false, then a bubble sort of trunk groups with the highest match score first occurs (block 520). If the trunk group list size is greater than zero (block 522), then a create a create sorted trunk list occurs (block 524). A determination is made whether this occurs at the next trunk group (block 526) and if not, then the group list is deleted (block 528) and a sorted trunk list returned (block 530). If the next trunk group is true, then a determination is made concerning while the trunks are in the group (block 532) followed by if this is true with the get next trunk (block 534) and adding an entry to the sorted trunk list (block 536).

Figure 8:
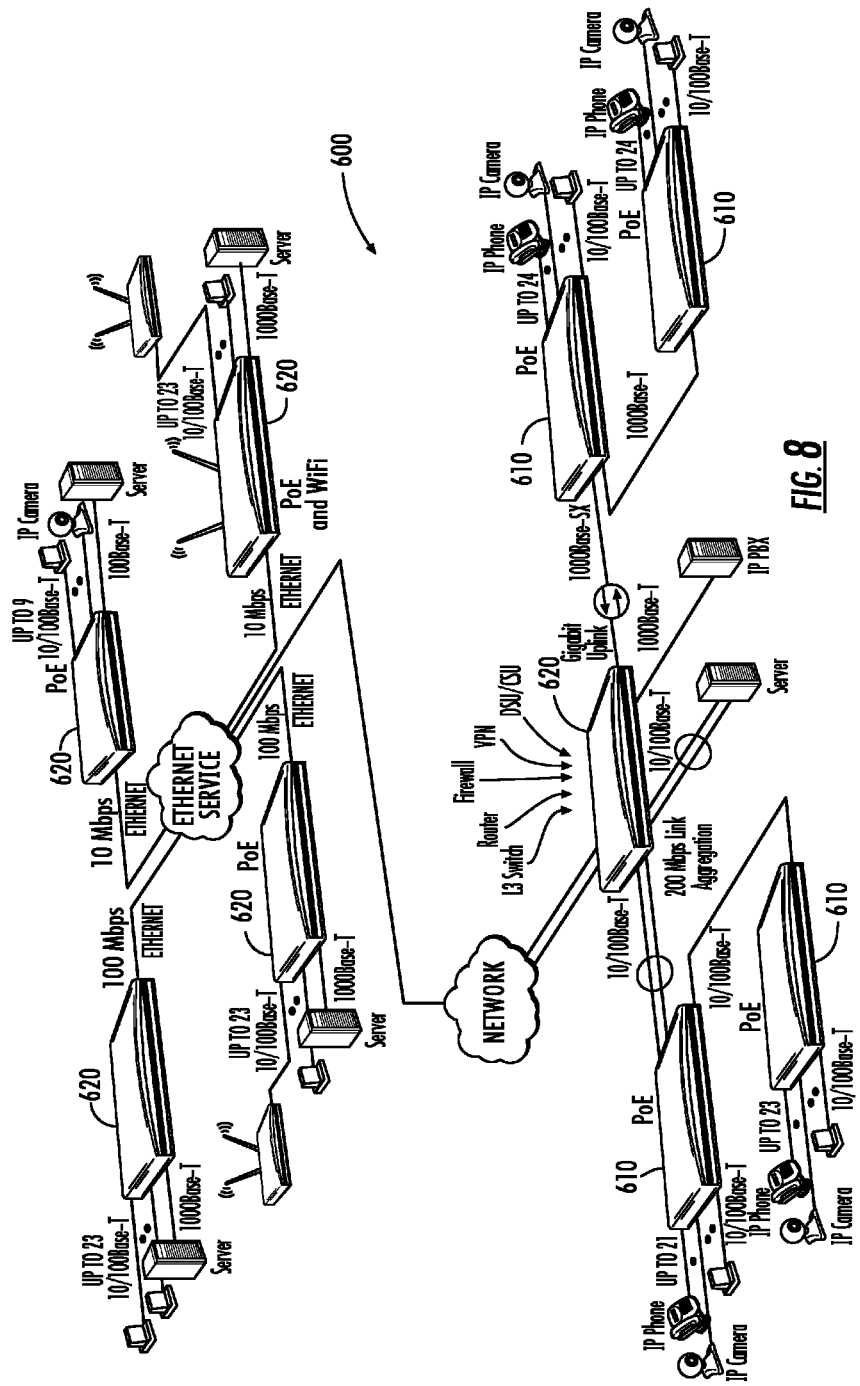
FIG. 8 is an example of a communications system that can use the method as described and incorporate various components of the communications system such as shown in FIGS. 1-6 in accordance with a non-limiting example.

There now follows a general description of a communications system to show a network example to which the system and method for controlling the PoE powered device as described can be applied. FIG. 8 is a system diagram of a communications system 600 that includes various network components, devices and methodology as shown in FIGS. 1 through 7A-7E and other interconnected platforms, switches and servers. It should be understood that the communications system 600 shown in FIG. 8 is only one non-limiting example of a communications system.

FIG. 8 shows the communications system that includes layer 2 and layer 3 network switching functionality. Typically, layer 2 switches are provided such as the NetVanta 1200 and 1500 series switches while layer 3 Ethernet switches are provided, such as NetVanta 1300 series devices as non-limiting examples. A example is the NetVanta 1335 and related series of devices. In FIG. 8, various devices such as a 1300 series devices by ADTRAN, INC. are set forth at 610 and 1200 series devices by ADTRAN, INC. as layer 2 devices are set forth at 620 in this non-limiting example.

Switches and other network devices as illustrated in one example run the ADTRAN Operating System (AOS) and provide standards-based, non-blocking switching and support for virtual LAN's (VLAN's), Quality of Service (QOS), and Class of Service (COS) for applications such as VoIP, link aggregation, advanced management and remote configuration capability and other functions. The devices in some aspects are fully managed layer 2 and layer 3 fast Ethernet switches and include 802.3af Power over Ethernet (PoE) enabled capabilities. The quality of service capabilities support mission critical applications such as VoIP. A WiFi access controller, in one example, manages a plurality of Wireless Access Points (WAP's). These Ethernet switches support layer 2, 802.1p Class of Service (COS) and weighted round robin and strict priority queuing for traffic prioritization in an example. At layer 3, a multi-service router supports various markings and class-based weighted fair or low latency queuing.

As noted before, layer 2 switches are stackable PoE switches with gigabit uplinks. In a non-limiting example, a Wireless Access Point (WAP) uses a NetVanta 150 wireless access point (WAP) or NetVanta 1335 with WiFi that provides 802.11 a/b/g radio support and Virtual Access Points (VAP's) and segment wireless networks together. All-in-one switch-routers perform services such as switching, IP routing, firewall, Virtual Private Networking (VPN), and 802.11a/b/g WiFi in a single platform. A NetVanta 1335 series switch integrates a modular IP access router and 24-port PoE layer 3 switch, firewall, VP and appliance and wireless access in a platform. Layer 2 switch-routers are all-in-one access platforms such as the NetVanta 1200 series switch-routers for a cost-effective, single box approach to Voice over IP (VoIP) migration. Layer 3 switching is provided for VLAN trunking and VGRP for 802.1Q VLAN functionality and provide separation of broadcast domains and functional work areas.

Other communications servers in an example are used in the illustrated networks of FIG. 8 such as a NetVanta 7000 series servers and devices (including NetVanta 7100 devices) as manufactured by ADTRAN, INC. of Huntsville, Ala. The communication servers are an all-in-one, office-in-a-box that provides voice and data solutions, including Private Branch Exchange (PBX) functionality. SIP communications are used to various remote sites having communications servers such as IP business gateways.

Any communications servers could be formed as a single chassis and provide a LAN-to-WAN infrastructure and Quality of Service (QoS) that maintains voice quality and includes a Graphical User Interface (GUI) for network set-up and facilitate installation and system administration. In this example, a communications server allows a converged IP voice and data network with a full-function IP PBX for voice such as a NetVanta 7000 series. It includes an integrated Power Over Ethernet (POE) switch-router for data in an integrated device and a Virtual Private Network (VPN) for secure internet tunnelling. The device enables VoIP by providing the appropriate functionality that includes SIP-based telephony features, voice mail, multi-level auto-attendant, caller ID name/number, and other features for a complete VoIP network. The device includes multi-site SIP networking and SIP trunking service. Various optional modules include T1 and ADSL Network Interface Modules (NIMs). Analog (FXS, FXO) Voice Interface Modules (VIMs) are included in another example with T1, PRI voice interface modules and fiber SFP modules.

A communications server, in one example, is an integrated communications platform and includes capability of a fast Ethernet switch with Gigabit uplinks and expansion slots for the network interface modules and voice interface modules. A IP telephone system as part of the communications network 200 as illustrated could include voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. Some devices can operate as an integral SIP gateway with the appropriate FXS and FXO analog interfaces to support analog phones, fax machines, modems and credit card readers. An integrated voice mail can include 3,000 or more messages on eight ports and multi-level auto-attendant that are multi-level on eight ports such as in the example of a NetVanta 7000 series device. These devices include, in one example, a full function IP access router and an integrated state inspection firewall protects against the Denial-of-Service (DOS) attempts. The devices include IP Sec VP and tunnelling with DES/3DES/AES encryption and an SIP-aware firewall, and include T.38 support and a door relay, music-on-hold (MOH) interfaces and Voice Quality Monitoring (VQM).

In one example, SIP networking is supported between multiple locations. A business can connect multiple sites and have three or four digit dialing and local call routing and survivability and on-net calls for toll bypass. Multiple SIP trunks allow a communications server to connect to other communication servers. Remote SIP trunks can be supported and connect to all endpoints at all locations such that a user can have local voice mail and auto-attendant services. A hub and spoke SIP network can be accomplished in another example.

A dedicated communications server can aggregate SIP trunks at a central location, which for qualified applications, increases the number of other communication servers that can be networked together.

The user can use an Internet Protocol (IP) phone such as an IP 700 series of telephones with different line versions and support multiple call functions. It is possible to incorporate voice mail-to-email applications and personal auto-attendant in which each phone sets up their own automatic attendant. It is also possible for the communications server to ring a series of stations and one external phone number. A communications server can include a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for a communications server to work in a multi-vendor environment and with an integrated T1-PRI trunk to consolidate separate voice lines and Internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of routing a call within a communications network, comprising:
    configuring a dialing plan at a call routing device connected within the communications network to restrict access of a caller to a selected outbound trunk from the call routing device based on an originating account of a caller as either a station or trunk and based on the number of the caller;
    receiving a call from a caller within the call routing device;
    determining an outbound trunk from the call routing device to which the call from the caller is routed at the call routing device if the configured dial plan permits the originating account and number of the caller to access a selected outbound trunk;
    routing at the call routing device the call from the caller onto the selected outbound trunk; and
    creating lists of automatic number identification (ANI) templates and applying the lists to trunk groups in an order as they are listed.

2. The method according to claim 1, and further comprising configuring the dialing plan such that certain callers are allowed to call out a given trunk, while all other callers are denied.

3. The method according to claim 1, and further comprising configuring the dialing plan such that certain callers are blocked from using a trunk, while other callers are permitted to use the trunk.

4. The method according to claim 1, and further comprising restricting calls to a trunk based on both the dialed number and identity of the caller.

5. The method according to claim 1, and further comprising applying at least one list of ANI templates as permit or deny access categories on selected trunk groups.

6. The method according to claim 1, and further comprising establishing trunks that accept a dialed number identification service (DNIS).

7. The method according to claim 1, and further comprising creating at least one list of trunks and trunk groups connected to the call routing device, adding station and trunk configurations to the at least one list, and applying to the at least one list different permit or deny access categories on selected trunk groups.

8. The method according to claim 7, and further comprising applying trunk lists to trunk groups in an order as they are listed.

9. A method of routing a call within a communications network, comprising:
- configuring a dialing plan at a call routing device connected within the communications network to restrict access of a caller to a selected outbound trunk from the call routing device based on an originating account of a caller as either a station or trunk of a caller and the number of a caller by creating one or more lists of automatic number identification (ANI) templates and one or more lists of trunks and applying those lists as permit or deny access categories on selected trunk groups and applying lists of ANI templates to trunk groups in an order as they are listed;
- receiving a call from a caller within the call routing device;
- determining an outbound trunk from the call routing device to which the call from the caller is routed at the call routing device if the configured dial plan permits the originating account and number of the caller to access a selected outbound trunk; and
- routing at the call routing device the call from the caller onto the selected outbound trunk.

10. The method according to claim 9, and further comprising configuring the dialing plan such that certain callers are specifically allowed to call out a given trunk, while all other callers are denied.

11. The method according to claim 9, and further comprising configuring the dialing plan such that certain callers are specifically blocked from using a trunk, while other callers are permitted.

12. The method according to claim 9, and further comprising restricting calls to a trunk based on both the dialed number and identity of the caller.

13. The method according to claim 9, and further comprising establishing trunks that accept a dialed number identification service (DNIS).

14. A communications system comprising:
- a plurality of network elements forming a communications network and having a plurality of trunks forming trunk groups; and
- a call routing device within the communications network and interconnected to said plurality of trunks forming trunk groups that receives a call from a caller, said call routing device comprising a database that stores a dialing plan having data related to restrictions as to which outbound trunk from the call routing device can be used based on an originating account as either a station or trunk of a caller and the number of a caller, and a call router processor operative with the database and configured to determine an outbound trunk from the call routing device to which a call from a caller is routed at the call routing device if the configured dial plan permits the originating account and number of the caller to access the selected outbound trunk, and a call router configured to route the call from the caller onto the selected outbound trunk and create lists of automatic number identification (ANI) templates and apply the lists to trunk groups in an order as they are listed.

15. The communications system according to claim 14, wherein said call router processor is configured to determine that certain callers are specifically allowed to call out a given trunk while all other callers are denied access based on said stored dialing plan.

16. The communications system according to claim 14, wherein said call router processor is configured to determine that certain callers are specifically blocked from using a trunk while other callers are permitted to access based on said stored dialing plan.

17. The communications system according to claim 14, wherein said call router processor is configured to restrict calls to a trunk based on both the dialed number and identity of the caller.

18. The communications system according to claim 14, wherein said database comprises data relating to a list of automatic number identification (ANI) templates and wherein said call router processor is configured to apply the list as permit or deny access categories on selected trunk groups.

19. The communications system according to claim 14, wherein said database comprises data relating to station and trunk configurations.

20. The communications system according to claim 14, wherein said database comprises data relating to trunk groups that accept a dialed number identification service (DNIS) and said call router processor is configured to determine a trunk group to which a call is routed based on the DNIS.

21. The communications system according to claim 14, wherein said communications network comprises a public switched telephone network (PSTN).

22. The communications system according to claim 14, wherein said communications network operates in accordance with a Voice over Internet Protocol (VoIP).

23. A method of routing a call within a communications network, comprising:
- configuring a dialing plan at a call routing device connected within the communications network to restrict access of a caller to a selected outbound trunk from the call routing device based on an originating account of a caller as either a station or trunk or based on the number of the caller;
- receiving a call from a caller within the call routing device;
- determining an outbound trunk from the call routing device to which the call from the caller is routed at the call routing device if the configured dial plan permits the originating account or number of the caller to access a selected outbound trunk;
- routing at the call routing device the call from the caller onto the selected outbound trunk while restricting calls to a trunk based on both the dialed number and identity of the caller; and
- creating lists of automatic number identification (ANI) templates and applying the lists to trunk groups in an order as they are listed.

24. A method of routing a call within a communications network, comprising:
- configuring a dialing plan at a call routing device connected within the communications network to restrict access of a caller to a selected outbound trunk from the call routing device based on an originating account of a caller as either a station or trunk or based on the number of the caller;

receiving a call from a caller within the call routing device;

determining an outbound trunk from the call routing device to which the call from the caller is routed at the call routing device if the configured dial plan permits the originating account or number of the caller to access a selected outbound trunk; and routing at the call routing device the call from the caller onto the selected outbound trunk while creating at least one list of automatic number identification (ANI) templates and applying the at least one list as permit or deny access categories on selected trunk groups and applying the lists of ANI templates to trunk groups in an order as they are listed.

25. A method of routing a call within a communications network, comprising:

configuring a dialing plan at a call routing device connected within the communications network to restrict access of a caller to a selected outbound trunk from the call routing device based on an originating account of a caller as either a station or trunk or based on the number of the caller;

receiving a call from a caller within the call routing device;

determining an outbound trunk from the call routing device to which the call from the caller is routed at the call routing device if the configured dial plan permits the originating account or number of the caller to access a selected outbound trunk;

routing at the call routing device the call from the caller onto the selected outbound trunk; and creating at least one list of trunks and trunk groups connected to the call routing device, adding station and trunk configurations to the at least one list, and applying to the at least one list different permit or deny access categories on selected trunk groups and creating lists of automatic number identification (ANI) templates and applying the lists to trunk groups in an order as they are listed.

26. A communications system comprising:

a plurality of network elements forming a communications network and having a plurality of trunks forming trunk groups; and a call routing device within the communications network and interconnected to said plurality of trunks forming trunk groups that receives a call from a caller, said call routing device comprising a database that stores a dialing plan having data related to restrictions as to which outbound trunk from the call routing device can be used based on an originating account as either a station or trunk of a caller or the number of a caller, and a call router processor operative with the database and configured to determine an outbound trunk from the call routing device to which a call from a caller is routed at the call routing device if the configured dial plan permits the originating account or number of the caller to access the selected outbound trunk, and a call router configured to route the call from the caller onto the selected outbound trunk, wherein said call router processor is configured to restrict calls to a trunk based on both the dialed number and identity of the caller, said call router processor configured to create lists of automatic number identification (ANI) templates and apply the lists to trunk groups in an order as they are listed.

27. A communications system comprising:

a plurality of network elements forming a communications network and having a plurality of trunks forming trunk groups; and a call routing device within the communications network and interconnected to said plurality of trunks forming trunk groups that receives a call from a caller, said call routing device comprising a database that stores a dialing plan having data related to restrictions as to which outbound trunk from the call routing device can be used based on an originating account as either a station or trunk of a caller or the number of a caller, and a call router processor operative with the database and configured to determine an outbound trunk from the call routing device to which a call from a caller is routed at the call routing device if the configured dial plan permits the originating account or number of the caller to access the selected outbound trunk, and a call router configured to route the call from the caller onto the selected outbound trunk, wherein said database comprises data relating to a list of automatic number identification (ANI) templates and wherein said call router processor is configured to apply the list as permit or deny access categories or selected trunk groups and apply lists of ANI templates to trunk groups in an order as they are listed.

28. A communications system comprising:

a plurality of network elements forming a communications network and having a plurality of trunks forming trunk groups; and a call routing device within the communications network and interconnected to said plurality of trunks forming trunk groups that receives a call from a caller, said call routing device comprising a database that stores a dialing plan having data related to restrictions as to which outbound trunk from the call routing device can be used based on an originating account as either a station or trunk of a caller or the number of a caller, and a call router processor operative with the database and configured to determine an outbound trunk from the call routing device to which a call from a caller is routed at the call routing device if the configured dial plan permits the originating account or number of the caller to access the selected outbound trunk, and a call router configured to route the call from the caller onto the selected outbound trunk, wherein said database comprises data relating to trunk groups that accept a dialed number identification service (DNIS) and call router processor is configured to determine a trunk group to which a call is routed based on the DNIS and create lists of automatic number identification (ANI) templates and apply the lists to trunk groups in an order as they are listed.

\* \* \* \* \*